(12) United States Patent
Wickert et al.

(10) Patent No.: US 6,352,001 B1
(45) Date of Patent: Mar. 5, 2002

(54) NON-ITERATIVE METHOD FOR OBTAINING MASS FLOW RATE

(75) Inventors: Thomas Edward Wickert, Clifton Park; Ravi Rajamani, Schenectady, both of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/385,572

(22) Filed: Aug. 30, 1999

(51) Int. Cl.$^7$ .................................................. G01F 1/37
(52) U.S. Cl. ...................................................... 73/861.52
(58) Field of Search .......................... 73/861.52, 861.63, 73/861.64, 861.53, 211, 213

(56) References Cited

U.S. PATENT DOCUMENTS

| | | | |
|---|---|---|---|
| 3,686,946 A | * | 8/1972 | Halmi ........................... 73/213 |
| 3,733,901 A | * | 5/1973 | Halmi ........................... 73/213 |
| 4,396,299 A | * | 8/1983 | Clingman, Jr. et al. ....... 374/37 |
| 4,528,847 A | * | 7/1985 | Halmi ........................... 73/195 |
| 6,012,474 A | * | 7/1985 | Takamoto et al. ............. 137/14 |
| 5,226,728 A | | 7/1993 | Vander Heyden |
| 5,323,657 A | | 6/1994 | Vander Heyden |
| 5,365,795 A | | 11/1994 | Brower, Jr. |
| 5,682,410 A | | 10/1997 | McGrady et al. |
| 5,880,378 A | * | 3/1999 | Behring, II .............. 73/861.53 |

OTHER PUBLICATIONS

The American Society of Mechanical Engineers; Measurement of Fluid Flow in Pipes Using Orifice, Nloozzle and Venturi; 1990; p 10.

Box et al; "Statistics for Experiments: An Introduction to Design, Data Analysis, and Model Building"; 1978; pp 482–483.

* cited by examiner

*Primary Examiner*—Benjamin R. Fuller
*Assistant Examiner*—Jewel Thompson
(74) *Attorney, Agent, or Firm*—Nixon & Vanderhye PC

(57) ABSTRACT

The present invention provides a method for calculating flow rate of a fluid using a pressure differential device, based on detected pressure and temperature upstream of and detected pressure adjacent a flow constriction of the pressure differential device, and calibration coefficients calculated from the results of a flow calibration performed on the pressure differential device. By incorporating the results of the flow calibration in the computation, a non-iterative method for obtaining mass flow rate is realized.

16 Claims, 2 Drawing Sheets

NON-ITERATIVE METHOD FOR OBTAINING MASS FLOW RATE

BACKGROUND OF THE INVENTION

This invention relates to the determination of mass flow rate and, more particularly, to an accurate, non-iterative method of calculating mass flow rate using a pressure differential device, such as a venturi flow meter. In an exemplary application, this non-iterative method can be implemented within the controller of a combined-cycle power generation system for computing steam flow rate for each venturi in the steam cooling system.

The steam cooling system for a combined cycle plant incorporates multiple venturis for steam flow rate control and protection. These venturis must provide accurate flow rate information over a range of steam pressures and temperatures to ensure successful operation of the system.

With reference to FIG. 1, a venturi 10 is a pressure differential device which is inserted in a conduit and is used to determine the rate of flowing fluid within the conduit. In FIG. 1 a conduit 12 is illustrated having a longitudinal flow path through which a fluid may flow as shown by the flow arrow. The upstream pressure P1 is sensed by a fluid pressure sensor 14. A temperature probe 16 is provided to detect fluid temperature upstream. Pressure P2 is detected in the throat 18 of the venturi. A flow computer or processor 20 receives pressure P1, pressure P2 and the temperature T. Based on this information and predetermined information, the processor calculates the flow rate. The measurements are shown referenced to upstream conditions only as an example.

Discharge coefficient is a variable in the computation of venturi mass flow rate. Reynolds number is a measure of the ratio of the inertial to viscous forces that the flowing fluid experiences within the venturi. A flow calibration performed on the venturi will reveal how the discharge coefficient varies with Reynolds number. A typical plot of flow calibration data is illustrated in FIG. 2. Note that the discharge coefficient drops off quite rapidly for low Reynolds numbers.

The current approach to obtaining venturi mass flow rate involves either an iteration upon mass flow rate or an assumption of constant discharge coefficient.

In accordance with the iteration method, since both discharge coefficient and Reynolds number are a function of mass flow rate, which is unknown, a guess is first made at the discharge coefficient. From this discharge coefficient, a mass flow rate, $q_m$, is computed as follows, using the ASME definition of venturi mass flow rate, See e.g., "Measurement of Fluid Flow in Pipes Using Orifice, Nozzle, and Venturi," ASME MFC-3M-1989:

$$q_m = 0.09970190 C Y_1 d^2 (h_w \rho_{f1}/(1-\beta^4))^{0.5} \quad (1)$$

wherein:

$q_m$=mass rate of flow, lbm/sec

C=venturi discharge coefficient, dimensionless $Y_1$=expansion factor based on upstream absolute static pressure, dimensionless d=venturi throat diameter at flowing conditions, inch D=upstream internal pipe diameter at flowing conditions, inch $h_w$=differential pressure, inches of water $\rho_{f1}$=density of the flowing fluid based on upstream absolute static conditions, lbm/cuft $\beta$=diameter ratio at flowing conditions, $\beta=d/D$, dimensionless Reynolds number, $R_d$ is then computed from mass flow rate as follows:

$$R_d = 48 q_m/(\pi d \mu) \quad (2)$$

wherein:

$R_d$=Reynolds number referred to d, dimensionless $q_m$=mass rate of flow, lbm/sec d=venturi throat diameter at flowing conditions, inch $\mu$=absolute viscosity of the flowing fluid, lbm/ft-sec, based on upstream temperature.

In the same reference (ASME MFC-3M-1989), an equivalent expression for mass flow rate based on downstream conditions (pressure and temperature) is given.

Since the venturi flow calibration is typically presented as a curve relating discharge coefficient to Reynolds number (see, for example, the typical calibration curve of FIG. 2), a new discharge coefficient can then be computed from the Reynolds number. From this new discharge coefficient, a new mass flow rate is then computed using Equation 1. This process is repeated until the change in computed mass flow rate from one iteration to the next is insignificant.

In accordance with the constant discharge coefficient method, discharge coefficient is assumed to be constant, which eliminates the need to iterate. However, this method limits the ability to accurately compute mass flow rate, especially in the low Reynolds number region where the discharge coefficient can vary quite dramatically.

BRIEF SUMMARY OF THE INVENTION

A non-iterative method for obtaining mass flow rate using a pressure differential flow meter is provided by the invention. More specifically, a non-iterative routine has been developed to compute mass flow rate quickly and accurately by incorporating the results from a flow calibration performed on each venturi directly in the computation.

Accordingly, the invention is embodied in a method for determining mass flow rate of a fluid flowing through a conduit having a first flow passage area, comprising the steps of: providing a pressure differential device comprising a flow constriction defining a fluid passage having a second flow passage area; flowing fluid through the pressure differential device; sensing a fluid pressure P1 at a first pressure sensing location in the conduit remote from the flow constriction; sensing a fluid pressure P2 at a second pressure sensing location downstream of an entrance of the flow constriction; and determining the mass flow rate based on sensed values of the fluid pressure P1 and the fluid pressure P2, and an expression of discharge coefficient C as a function of Reynolds Number $R_d$ determined from flow calibration data obtained by performing a flow calibration on the flow constricting member. In the presently preferred embodiment, the functional expression is a polynomial expression, and the mass flow rate is determined based on the polynomial coefficients of the polynomial expression. In the presently preferred embodiment, furthermore, a fluid temperature T in the conduit is also sensed and the sensed temperature is used in the determination of mass flow rate.

BRIEF DESCRIPTION OF THE DRAWINGS

These, as well as other objects and advantages of this invention, will be more completely understood and appreciated by careful study of the following more detailed description of a presently preferred exemplary embodiments of the invention taken in conjunction with the accompanying drawings, in which.

DETAILED DESCRIPTION OF THE INVENTION

Figure 2:
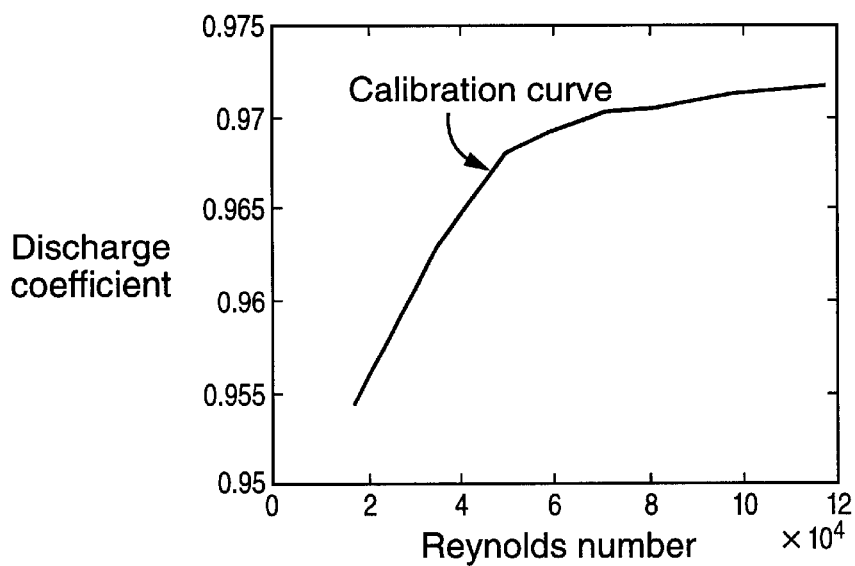
FIG. 2 illustrates a typical discharge coefficient versus Reynolds number calibration curve.

A flow calibration can be performed on a venturi to reduce the percentage of uncertainty of the discharge coefficient. Typically, as illustrated in FIG. 2, the result of a venturi flow calibration is presented as a plot of discharge coefficient, C, versus Reynolds number, $R_d$. To accurately compute venturi mass flow rate, discharge coefficient must be represented as a function of Reynolds number. Using standard regression analysis (see any textbook on statistics or numerical analysis, e.g., "Statistics for Experiments," E. P. Box et al., New York, Wiley-Interscience, 1978), a quadratic ($2^{nd}$ order polynomial) equation can be fit to this flow calibration data. Although the method described herein below refers to a quadratic expression of discharge coefficient as a function of Reynolds number, it may be applied to a cubic ($3^{rd}$ order polynomial) expression as well. However, for all cases tested to date, the quadratic expression appears to adequately represent discharge coefficient as a function of Reynolds number.

A general quadratic relationship between C and $R_d$ is presented in Equation 3. Specific values for the polynomial coefficients $a_0$, $a_1$, $a_2$ are determined from the regression analysis on the flow calibration data, as mentioned above.

$$C = a_2 R_d^2 + a_1 R_d + a_0 \quad (3)$$

Multiplying both sides of Equation 3 by $q_m/C$ yields:

$$q_m = a_2 R_d^2 (q_m/C) + a_1 R_d (q_m/C) + a_0 (q_m/C) \quad (4)$$

Subtracting $q_m$ from both sides of Equation 4 yields:

$$0 = a_2 R_d^2 (q_m/C) + a_1 R_d (q_m/C) - q_m + a_0 (q_m/C) \quad (5)$$

The following equation can be obtained by rearranging Equation 5:

$$0 = (a_2 R_d^2/(q_m C)) q_m^2 + (a_1 R_d/C - 1) q_m + (a_0 q_m/C) \quad (6)$$

There exists two roots to Equation 6, but only one has a positive value. Mass flow rate can be solved for by selecting the root with the positive value.

$$q_m = (-b - (b^2 - 4ac)^{0.5})/2a \quad (7)$$

where:
$a = a_2 R_d^2/(q_m C) = a_2 (R_d/q_m)(R_d/q_m)(q_m/C)$
$b = a_1 R_d/C - 1 = a_1 (R_d/q_m)(q_m/C) - 1$
$c = a_0 (q_m/C)$ Equation 7 reveals that mass flow rate, $q_m$, can be computed without the need for iteration. All three variables, a, b and c in Equation 7 are directly computed from either known or measured parameters. The venturi flow calibration coefficients, $a_0$, $a_1$, $a_2$, are known as a result of the flow calibration performed on the venturi and subsequent regression analysis and values for $(q_m/C)$ and $(R_d/q_m)$ can be computed from measured parameters as presented in the following Equations 8 and 9, respectively. Equations 8 and 9 are simply rearranged versions of Equations 1 and 2, respectively.

$$(q_m/C) = 0.09970190 Y_1 d^2 (h_w \rho_{f\!1}/(1-\beta^4))^{0.5} \quad (8)$$

$$(R_d/q_m) = 48/(\pi d \mu) \quad (9)$$

wherein:
$q_m$ mass rate of flow, lbm/sec
$R_d$ Reynolds number referred to d, dimensionless
C (venturi) discharge coefficient, dimensionless
$a_0 a_1 a_2$ venturi flow calibration coefficients, lbm/sec
D upstream internal pipe diameter at flowing conditions, inch
d flow constriction minimum (venturi throat) diameter at flowing conditions, inch
$Y_1$ expansion factor based on upstream absolute static pressure, dimensionless
$h_w$ differential pressure, inches of water
$\rho_{f\!1}$ density of the flowing fluid based on upstream absolute static conditions, lbm/cuft
$\beta$ diameter ratio at flowing conditions, $\beta = d/D$, dimensionless
$\mu$ absolute viscosity of the flowing fluid, lbm/ft-sec, based on temperature.

Referring again to FIG. 1, wherein a venturi as shown generally at 10 is disposed in conduit 12, the upstream pressure P1 is detected at 14, i.e. upstream of the flow constriction defined by the venturi. Further, pressure P2 is detected downstream of the entrance to the constricted passage. Where the flow constriction device is a venturi, pressure P2 is detected at the throat passage 18. Temperature probe 16 is provided for measuring temperature T of the fluid flowing through conduit 12. Generally, it is contemplated that such a temperature probe would be included due to the density and viscosity variations caused by changes in temperature. The density value and viscosity value for the respective detected temperature may be determined from stored data or other suitable method for use in the above-described computation. Detected pressure P1 and P2 are utilized for example to calculate differential pressure $h_w$. The other variables used to ascertain flow rate, such as the upstream internal pipe diameter and the venturi throat diameter, are predetermined. Based on the predetermined information and the measured data P1, P2, and temperature T, as well as the venturi flow calibration coefficients $a_0$, $a_1$, $a_2$, the processor 20 can calculate flow rate as described above.

Figure 1:
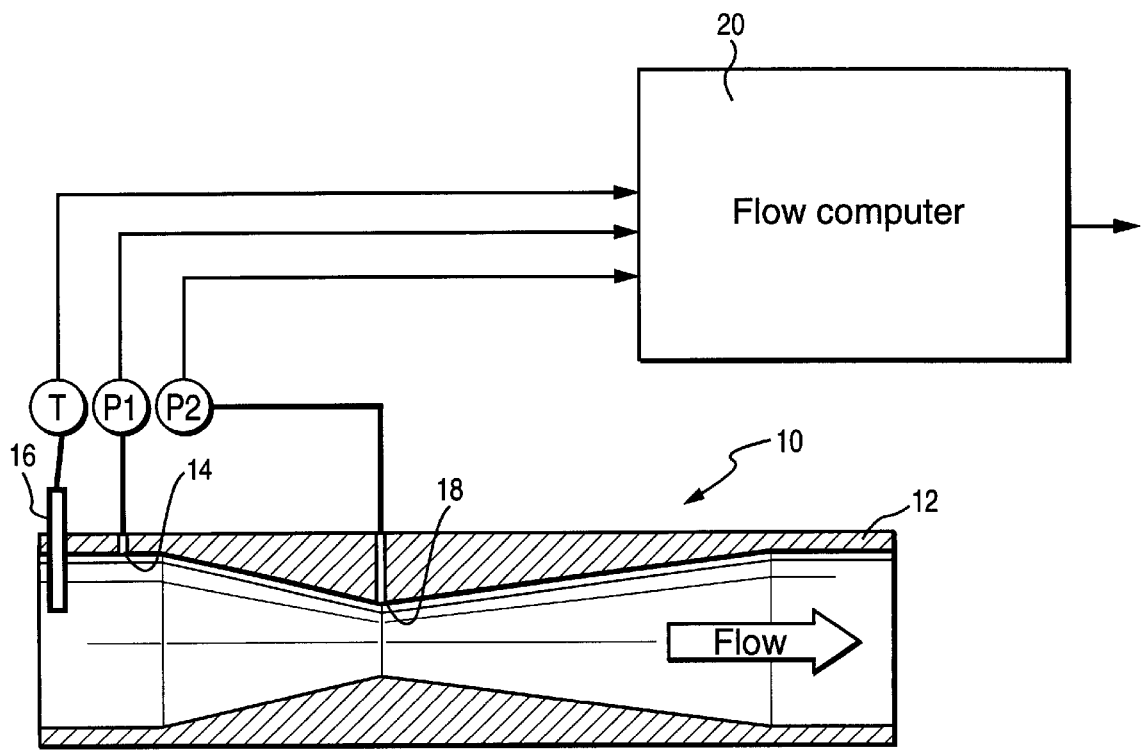
FIG. 1 is a schematic view of a venturi flow meter.
Figure 3:
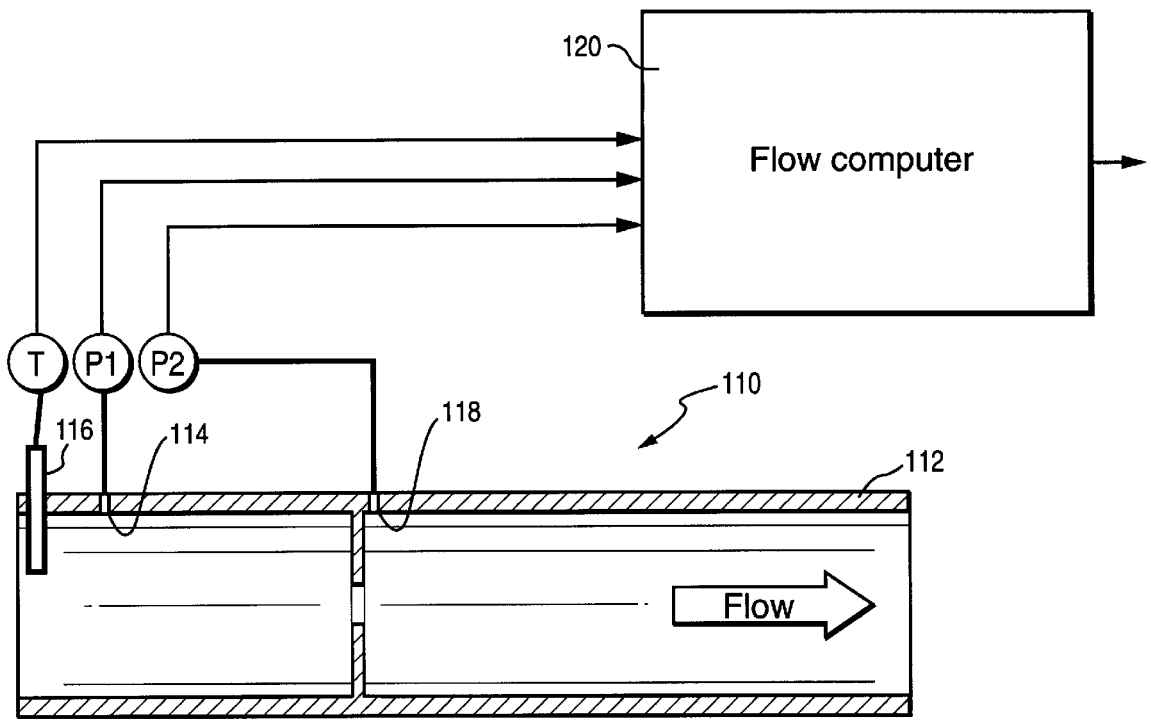
FIG. 3 is a schematic illustration of a fluid conducting conduit having an orifice plate pressure differential device.
Figure 4:
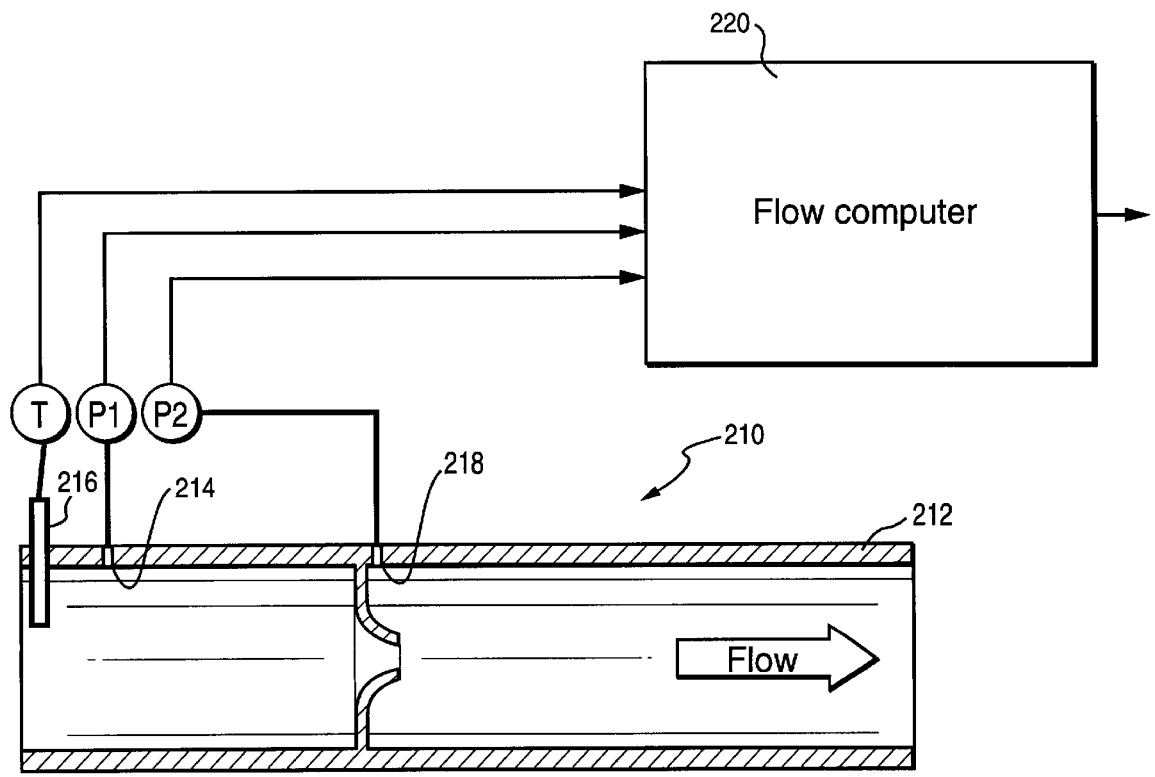
FIG. 4 is a schematic illustration of a fluid conducting conduit having a flow nozzle pressure differential device.

Although the computation of mass flow rate in accordance with the invention has been discussed in detail with reference to computing venturi mass flow rate, this routine could also be used to accurately compute orifice and nozzle mass flow rate. In that regard, orifice and nozzle pressure differential devices are shown respectively in FIGS. 3 and 4 wherein components that are the same as or replace components shown in FIG. 1 are labeled with corresponding reference numerals indexed by 100 and 200, respectively, but are not discussed in detail herein. Similar to the venturi 10, the orifice 110 and the nozzle 210 are pressure differential devices which can be inserted in a conduit and used to determine the mass flow rate of flowing fluid within that conduit. The standard equation for computing flow through an orifice 110 or a nozzle 210, as illustrated in FIGS. 3 and 4, respectively, is identical to Equation 1 presented hereinabove. Therefore, the determination of orifice mass flow rate and nozzle mass flow rate corresponds to the discussion above with respect to venturi mass flow rate.

Completely analogous to the description given above, the mass flow rate can be calculated based on pressure and temperature measured downstream of the device. The ASME reference (ASME MFC-3M-1989) can be consulted for the expression for mass flow rate for downstream conditions corresponding to equation (1) discussed hereinabove, from which an expression of $q_m/C$ and be derived. That expression and the expression for $R_d/q_m$ can then be used for the determination of mass flow rate without iteration as detailed hereinabove.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of calculating a flow rate of fluid flowing through a conduit, the method comprising the steps of:
   providing a flow constricting member in said conduit, said flow constricting member defining a fluid passage of a preselected flow area;
   flowing fluid through said flow constricting member;
   sensing a fluid pressure P1 at a first pressure sensing location remote from said flow constricting member;
   sensing a fluid pressure P2 at a second pressure sensing location downstream of an entrance of said flow constricting member; and
   determining said mass flow rate in the absence of iteration based on detected values of said fluid pressure P1 and said fluid pressure P2, and an expression of discharge coefficient C as a function of Reynolds Number $R_d$ determined from flow calibration data obtained from a flow calibration performed on said flow constricting member.

2. A method as in claim 1, further comprising performing a flow calibration on said flow constricting member to obtain said flow calibration data and determining from the flow calibration data an expression of discharge coefficient C as a function of Reynolds Number $R_d$.

3. A method as in claim 1, further comprising sensing a fluid temperature T remote from said flow constricting member and wherein said step of determining said mass flow rate is further based on the detected value of said fluid temperature.

4. A method as in claim 1, wherein said step of sensing a fluid pressure P1 comprises detecting said fluid pressure P1 upstream of said flow constricting member.

5. A method as in claim 4, further comprising sensing a fluid temperature T upstream from said flow constricting member and wherein said step of determining said mass flow rate is further based on the detected value of said fluid temperature.

6. A method as in claim 1, wherein said step of providing a flow constricting member comprises providing one of a device having a flow constriction orifice, a device having a flow nozzle and a device having a venturi throat passage.

7. A method as in claim 1, wherein said step of determining said mass flow rate comprises determining said mass flow rate based on the functional expression $C = a_2 R_d^2 + a_1 R_d + a_0$.

8. A method as in claim 4, wherein said step of determining said mass flow rate comprises determining said mass flow rate based on the functional expression $C = a_2 R_d^2 + a_1 R_d + a_0$ and wherein said step of determining said mass flow rate is generally in accordance with the following equation:

$$q_m = (-b - (b^2 - 4ac)^{0.5})/2a \quad (7)$$

wherein:
$a = a_2 R_d^2/(q_m C) = a_2(R_d/q_m)(R_d/q_m)(q_m/C)$
$b = a_1 R_d/C - 1 = a_1(R_d/q_m)(q_m/C) - 1$
$c = a_0(q_m/C)$ $$(q_m/C) = 0.09970190 Y_1 d^2 (h_w \rho_{fl}/(1-\beta^4))^{0.5} \quad (8)$$

$$(R_d/q_m) = 48/(\pi d \mu) \quad (9)$$

and wherein:
$q_m$ = mass rate of flow, lbm/sec
$R_d$ = Reynolds number referred to d, dimensionless
C = discharge coefficient, dimensionless
D = upstream internal pipe diameter at flowing conditions, inch
d = flow constriction minimum diameter at flowing conditions, inch
$Y_1$ = expansion factor based on upstream absolute static pressure, dimensionless
$h_w$ = differential pressure, inches of water
$\rho_{fl}$ = density of the flowing fluid based on upstream absolute static conditions, lbm/cuft
$\beta$ = diameter ratio at flowing conditions, $\beta = d/D$, dimensionless
$\mu$ = absolute viscosity of the flowing fluid, lbm/ft-sec, based on temperature.

9. A method for determining mass flow rate of a fluid flowing through a conduit having a first flow passage area, comprising the steps of:
   providing a pressure differential device, comprising a flow constriction defining a fluid passage having a second flow passage area;
   flowing fluid through said pressure differential device;
   sensing a fluid pressure P1 at a first pressure sensing location in said conduit remote from said flow constriction;
   sensing a fluid pressure P2 at a second pressure sensing location downstream of an entrance of said flow constriction; and
   determining said mass flow rate based on sensed values of said fluid pressure P1 and said fluid pressure P2, and polynomial coefficients of a polynomial expression of discharge coefficient C as a function of Reynolds Number $R_d$ determined from flow calibration data obtained from a flow calibration performed on said pressure differential device.

10. A method as in claim 9, further comprising performing a flow calibration on said pressure differential device to obtain said flow calibration data and determining from the flow calibration data said polynomial expression of discharge coefficient C as a function of Reynolds Number $R_d$.

11. A method as in claim 9, further comprising sensing a fluid temperature T remote from said pressure differential device and wherein said step of determining said mass flow rate is further based on the detected value of said fluid temperature.

12. A method as in claim 9, wherein said step of sensing a fluid pressure P1 comprises detecting said fluid pressure P1 upstream of said pressure differential device.

13. A method as in claim 12, further comprising sensing a fluid temperature T upstream from said pressure differential device and wherein said step of determining said mass flow rate is further based on the detected value of said fluid temperature.

14. A method as in claim 9, wherein said step of providing a pressure differential device comprises providing one of a device having a flow constriction orifice, a device having a flow nozzle, and a device having a venturi throat passage.

15. A method as in claim 9, wherein said step of determining said mass flow rate comprises determining said mass flow rate based on the polynomial equation $C = a_2 R_d^2 + a_1 R_d + a_0$.

16. A method as in claim 12, wherein said step of determining said mass flow rate comprises determining said mass flow rate based on the polynomial equation $C = a_2 R_d^2 + a_1 R_d + a_0$ and wherein said step of determining said mass flow rate is generally in accordance with the following equation:

$$q_m = (-b - (b^2 - 4ac)^{0.5})/2a \qquad (7)$$

wherein:

$a = a_2 R_d^2/(q_m C) = a_2 (R_d/q_m)(R_d/q_m)(q_m/C)$
$b = a_1 R_d/C - 1 = a_1 (R_d/q_m)(q_m/C) - 1$
$c = a_0 (q_m/C)$ $$(q_m/C) = 0.09970190 Y_1 d^2 (h_w \rho_{f1}/(1-\beta^4))^{0.5} \qquad (8)$$

$$(R_d/q_m) = 48/(\pi d \mu) \qquad (9)$$

and wherein:

$q_m$ = mass rate of flow, lbm/sec $R_d$ = Reynolds number referred to d, dimensionless $C$ = discharge coefficient, dimensionless $D$ = upstream internal pipe diameter at flowing conditions, inch $d$ = flow constriction minimum diameter at flowing conditions, inch $Y_1$ = expansion factor based on upstream absolute static pressure, dimensionless $h_w$ = differential pressure, inches of water $\rho_{f1}$ = density of the flowing fluid based on upstream absolute static conditions, lbm/cuft $\beta$ = diameter ratio at flowing conditions, $\beta = d/D$, dimensionless $\mu$ = absolute viscosity of the flowing fluid, lbm/ft-sec, based on temperature.

* * * * *